United States Patent
Miyazaki

(10) Patent No.: US 8,389,612 B2
(45) Date of Patent: Mar. 5, 2013

(54) RUBBER COMPOSITION FOR CAP TREAD AND TIRE HAVING CAP TREAD COMPRISING THE SAME

(75) Inventor: Tatsuya Miyazaki, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 476 days.

(21) Appl. No.: 12/500,318

(22) Filed: Jul. 9, 2009

(65) Prior Publication Data

US 2010/0036019 A1    Feb. 11, 2010

(30) Foreign Application Priority Data

Aug. 8, 2008 (JP) ................. 2008-206115

(51) Int. Cl.
*C08K 5/36* (2006.01)
(52) U.S. Cl. .......... 524/331; 524/262; 524/333
(58) Field of Classification Search .......... 524/331, 524/333, 262
See application file for complete search history.

(56) References Cited

U.S. PATENT DOCUMENTS

| | | | |
|---|---|---|---|
| 2,495,145 A | 1/1950 | Smith et al. | |
| 3,992,362 A | 11/1976 | Martin | |
| 5,217,807 A * | 6/1993 | Steiber et al. | 428/378 |
| 6,291,572 B1 * | 9/2001 | Brown et al. | 524/492 |
| 2004/0254301 A1 * | 12/2004 | Tsukimawashi et al. | 525/271 |
| 2006/0155026 A1 | 7/2006 | Aubert | |
| 2009/0151844 A1 | 6/2009 | Miyazaki | |

FOREIGN PATENT DOCUMENTS

| | | |
|---|---|---|
| EP | 1878206 A2 | 1/2008 |
| JP | 6-53768 A | 2/1994 |
| JP | 6-57767 A | 3/1994 |
| JP | 2000-80205 A | 3/2000 |
| JP | 2006-56979 A | 3/2006 |
| JP | 2006-225448 A | 8/2006 |
| JP | 2006-233177 A | 9/2006 |
| JP | 2007-302865 A | 11/2007 |
| JP | 2008-31427 A | 2/2008 |
| WO | WO 2008/007562 A1 | 1/2008 |

* cited by examiner

*Primary Examiner* — Peter D Mulcahy
(74) *Attorney, Agent, or Firm* — Birch, Stewart, Kolasch & Birch, LLP

(57) ABSTRACT

A rubber composition for cap tread satisfying both of low heat build-up property and fracture strength and a tire having cap tread using the same are provided. A rubber composition for cap tread including 0.5 to 10 parts by mass of an alkylphenol-sulfur chloride condensate (B) indicated by the formula (B1):

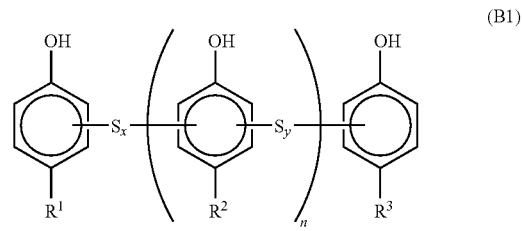

(B1)

(wherein $R^1$ to $R^3$ are same or different, either is an alkyl group having 5 to 12 carbons; x and y are same or different, and either is an integer of 2 to 4; n is an integer of 0 to 10.), 0 to 0.45 parts by mass of sulfur (C), and 10 to 100 parts by mass of silica (D), based on 100 parts by mass of a specific rubber component (A).

10 Claims, No Drawings

RUBBER COMPOSITION FOR CAP TREAD AND TIRE HAVING CAP TREAD COMPRISING THE SAME

BACKGROUND OF THE INVENTION

The present invention relates to a rubber composition for cap tread and a tire having cap tread comprising the same.

The low fuel cost of a car has been carried out by reducing the rolling resistance of a tire and suppressing heat build-up, in recent years. In particular, request for the low fuel cost of a car has been strengthened and more superior low heat build-up property is requested for tread having high occupied ratio in a tire among tire members.

Although superior grip performance is requested for the tread of a tire from the viewpoint of safety in the running of a car, the low fuel cost and grip performance are contradictory performance; therefore in general, both of the low fuel cost of a tire and grip performance are satisfied by making tread as the two layers structure of cap tread and base tread, adopting rubber having low heat build-up property as the base tread, using a rubber composition having high grip force for surface layer portion that is brought in contact with road surface such as the cap tread and using a rubber composition having low heat build-up property for inner layer portion such as the base tread.

As a method of reducing the rolling resistance of tire tread, there are mentioned a method of compounding the specific amount of two kinds of silica having different nitrogen adsorption specific surface areas (for example, Patent literature 1) and a method of compounding a modified styrene-butadiene rubber as a rubber component (for example, Patent literature 2).

Although it is also known as a rubber composition for cap tread that heat build-up property is suppressed by increasing the compounding amount of sulfur, the fracture strength TB and elongation at break (EB) are lowered when the compounding amount of sulfur is increased; therefore there have been problems that tread crack is generated and the life time of tire tread is shortened when the resulting rubber composition is used for the cap tread for tire.

Namely, fracture strength and low heat build-up property are contradictory physical property and it was difficult to satisfy both physical properties.

[Patent literature 1] Japanese Unexamined Patent Publication No. 2006-233177

[Patent literature 2] Japanese Unexamined Patent Publication No. 2006-56979

SUMMARY OF THE INVENTION

It is the purpose of the present invention to provide a rubber composition for cap tread satisfying both of the low heat build-up property and fracture strength and a tire having cap tread using the same.

The present invention relates to a rubber composition for cap tread including 0.5 to 10 parts by mass of an alkylphenol-sulfur chloride condensate (B) indicated by the formula (B1):

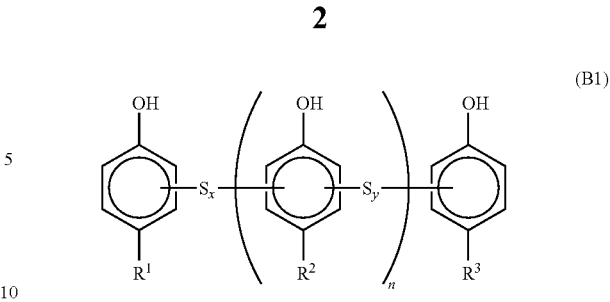

(wherein $R^1$ to $R^3$ are same or different, either is an alkyl group having 5 to 12 carbons; x and y are same or different, and either is an integer of 2 to 4; n is an integer of 0 to 10), 0 to 0.45 parts by mass of sulfur (C), and 10 to 100 parts by mass of silica (D), based on 100 parts by mass of a rubber component (A) comprising 30 to 80% by mass of a modified styrene-butadiene rubber and 20 to 70% by mass of at least one diene rubber selected from a group comprising a natural rubber, an isoprene rubber, a butadiene rubber, a modified butadiene rubber and a polybutadiene rubber comprising 1,2-syndiotactic crystals.

It is preferable to further include 2 to 50 parts by mass of carbon black (E) based on 100 parts by mass of the rubber component (A).

It is preferable to further include 0.1 to 5 parts by mass of a citraconic imide compound (F) based on 100 parts by mass of the rubber component (A).

It is preferable to further include 0.1 to 10 parts by mass of a metal salt of methacrylic acid (G) represented by the formula (1):

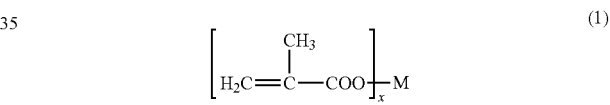

(wherein M is metal and x is an integer of 1 or 2), based on 100 parts by mass of the rubber component (A).

The present invention relates also to a tire having cap tread including the aforementioned rubber composition for cap tread.

DETAILED DESCRIPTION

The rubber composition of the present invention includes the rubber components (A), specific alkylphenol-sulfur chloride condensate (B), sulfur (C) and silica (D).

The rubber component includes 30 to 80% by mass of modified styrene-butadiene rubber (modified SBR) and at least one rubber selected from a group comprising a natural rubber (NR), an isoprene rubber (IR), a modified butadiene rubber (modified BR) of butadiene rubber (BR), polybutadiene rubber (BR including SPB) including 1,2-syndiotactic crystals.

The modified SBR includes a modified SBR by emulsion polymerization (modified E-SBR) and a modified SBR by solution polymerization (modified S-SBR), but the modified S-SBR is preferable because the molecular weight of polymer is easily controlled, low molecular weight component increasing tan δ can be lessened and low fuel cost can be improved by strengthening bond between silica and polymer chain and reducing tan δ at 30 to 60° C.

The amount of bonded styrene of the modified SBR is preferably at least 5% by mass and more preferably at least 7% by mass because reversion property at rubber compounding and grip property are superior. The amount of bonded styrene of the modified SBR is preferably at most 30% by mass and more preferably at most 20% by mass because low heat build-up property is superior.

As the modified SBR, those having a few amounts of bonded styrene such as HPR340 manufactured by JSR Corporation are preferable.

As the modified SBR, those coupled with tin and silicon are preferably used. As the coupling process of the modified SBR, there is mentioned a process of reacting alkali metal (such as Li) and alkali earth metal (such as Mg) at the molecular chain terminal of the modified SBR with tin halides and silicon halides.

The modified SBR is a (co)polymer obtained by (co)polymerizing conjugated diolefin alone or conjugated diolefin with an aromatic vinyl compound and has preferably a primary amino group and an alkoxysilyl group.

The primary amino group may be bonded with either of terminal at polymerization initiation, terminal at polymerization termination, polymer main chain and side chain, but it is preferably introduced in terminal at polymerization initiation or terminal at polymerization termination because energy loss from polymer terminal is suppressed and hysteresis loss property is improved.

The weight average molecular weight (Mw) of the modified SBR is preferably at least one million and more preferably at least 1.2 million because adequate fracture property is obtained. The Mw of the modified SBR is preferably at most 2 million and more preferably at most 1.8 million because the viscosity of a rubber can be adjusted and kneading process can be easily carried out.

The content of the modified SBR in the rubber component (A) is at least 30% by mass and preferably at least 40% by mass because grip property such as brake performance and steering response are superior. The content of the modified SBR in the rubber component (A) is at most 80% by mass and preferably at most 75% by mass because other rubber components such as NR and BR are used in combination and heat build-up is suppressed.

NR is not specifically limited, those usually used in the rubber industry can be used and RSS #3 and TSR20 are specifically mentioned. IR is not specifically limited and those conventionally used in the tire industry can be used.

The content of NR and/or IR in the rubber component (A) is at least 20% by mass and preferably at least 30% by mass because fracture strength and low heat build-up property are superior. The content of NR and/or IR in the rubber component (A) is at most 70% by mass and preferably at most 60% by mass because SBR superior in grip performance and steering stability is adequately compounded.

BR is not specifically limited and high cis content BR's (high cis BR) such as BR130B and BR150B available from Ube Industries, Ltd. can be preferably used.

The content of BR in the rubber component (A) is at least 20% by mass and preferably at least 30% by mass because abrasion resistance and low heat build-up property are superior. The content of BR in the rubber component (A) is at most 70% by mass and preferably at most 50% by mass because SBR superior in grip performance and steering stability is adequately compounded.

As the modified BR, there are preferable those that are obtained by polymerizing 1,3-butadiene by a lithium initiator and then adding a tin compound thereto and in which the terminal of the modified BR molecule is bonded with a tin-carbon bond.

The lithium initiator includes lithium compounds such as an alkyl lithium, aryl lithium, vinyl lithium, organic tin lithium and organic nitrogen lithium compound. The modified BR with high vinyl and low cis content can be prepared by using the lithium initiator as the initiator of the modified BR.

The tin compound includes tin tetrachloride, butyltin trichloride, dibutyltin dichloride, dioctyltin dichloride, tributyltin chloride, triphenyltin chloride, diphenyl dibutyltin, triphenyltin ethoxide, diphenyl dimethyltin, ditolyltin chloride, diphenyltin dioctanoate, divinyldiethyltin, tetrabenzyltin, dibutyltin distearate, tetraallyltin and p-tributyltin styrene. These tin compounds may be used alone and at least two kinds may be used in combination.

The content of a tin atom in the modified BR is preferably at least 50 ppm and more preferably at least 60 ppm. When the content of a tin atom is less than 50 ppm, effect for promoting the dispersion of carbon black in the modified BR tends to be little and tan δ tends to be increased when carbon black is compounded. The content of a tin atom is preferably at most 3000 ppm, more preferably at most 2500 ppm and further preferably at most 250 ppm. When the content of a tin atom exceeds 3000 ppm, the cohesiveness of a damped rubber after mixing tends to be inferior and the edges of mill sheet after extended by roller tend to be not arranged; therefore the extrusion processability of the kneaded article tends to be deteriorated.

The molecular weight distribution (Mw/Mn) of the modified BR is preferably at most 2 and more preferably at most 1.5. When the Mw/Mn of the modified BR exceeds 2, the dispersibility of carbon black tends to be deteriorated and tan δ tends to be increased.

The amount of a vinyl bond in the modified BR is preferably at least 5% by mass and more preferably at least 7% by mass. When the amount of a vinyl bond of the modified BR is less than 5% by mass, it tends to be difficult to polymerize (produce) the modified BR. The amount of a vinyl bond is preferably at most 50% by mass and more preferably at most 20% by mass. When the amount of a vinyl bond of the modified BR exceeds 50% by mass, and when carbon black is compounded, tensile strength tends to be lowered and the dispersibility of carbon black tends to be deteriorated.

The content of the modified BR in the rubber component (A) is at least 20% by mass and preferably at least 30% by mass because low heat build-up property is superior. The content of the modified BR in the rubber component (A) is at most 70% by mass and preferably at most 50% by mass because SBR superior in grip performance and steering stability is adequately compounded.

In the SPB-containing BR, 1,2-syndiotactic polybutadiene crystals (SPB) are not those in which crystals are merely dispersed in BR but preferably those in which they are chemically bonded with BR to be dispersed. Since the crystals are chemically bonded with the rubber component to be dispersed, the generation and propagation of crack tend to be suppressed. The SPB-containing BR is not specifically limited, but can be produced by, for example, a method described in Japanese Unexamined Patent Publication No. 11-349732.

The melting point of SPB is preferably at least 180° C. and more preferably at least 190° C. because crystals are not melted during the vulcanization of a tire by press and adequate hardness is obtained. The melting point of SPB is preferably at most 220° C. and more preferably at most 210° C. because the molecular weight of the SPB-containing BR is small and dispersibility is superior in the rubber composition.

The content of SPB in the SPB-containing BR is preferably at least 2.5% by mass and more preferably at least 10% by mass because adequate hardness is obtained. The content of SPB is preferably at most 20% by mass and more preferably at most 18% by mass because adequate fluidity in a container for polymer production is obtained, production efficiency is superior and the dispersibility of SPB is superior.

The content of the SPB-containing BR in the rubber component (A) is at least 20% by mass and preferably at least 30% by mass because abrasion resistance and low heat build-up property are superior. The content of the SPB-containing BR in the rubber component (A) is at most 70% by mass and preferably at most 50% by mass because SBR superior in grip performance and steering stability is adequately compounded.

The alkylphenol-sulfur chloride condensate (B) is a compound indicated by the formula (B1):

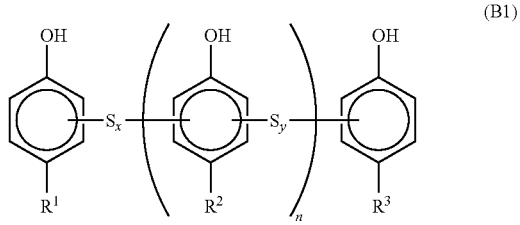

(B1)

(wherein $R^1$ to $R^3$ are same or different, either is an alkyl group having 5 to 12 carbons; x and y are same or different, and either is an integer of 2 to 4; n is an integer of 0 to 10).

Since the alkylphenol-sulfur chloride condensate (B) represented by the formula (B 1) has no polarity in aromatic rings, it can be dispersed well in the modified SBR in the rubber component (A).

n is an integer of 0 to 10 and preferably an integer of 1 to 9 in that the dispersibility of the alkylphenol-sulfur chloride condensate (B) in the rubber component (A) is good.

x and y are same or different, and either is an integer of 2 to 4 and both are preferably 2 in that the rubber composition can be efficiently hardened highly (reversion suppression).

$R^1$ to $R^3$ are same or different, and either is an alkyl group having 5 to 12 carbons and preferably an alkyl group having 6 to 9 carbons in that the dispersibility of the alkylphenol-sulfur chloride condensate (B) in the rubber component (A) is good.

The alkylphenol-sulfur chloride condensate (B) represented by the formula (B1) includes 10 to 30% by mass of sulfur depending on the kind of $R^1$ to $R^3$ and x and y. The dispersibility of the alkylphenol-sulfur chloride condensate (B) is better than sulfur itself in the rubber composition, and preventing reversion and hybrid vulcanizing formation (thermal stability) thereof are good. When sulfur (C) is not included, the concentration of sulfur in the rubber composition becomes low, but the sulfur of the alkylphenol-sulfur chloride condensate (B) is released at that time.

The alkylphenol-sulfur chloride condensate (B) can be prepared by known methods and its method is not specifically limited, but for example, a method of reacting alkylphenol with sulfur chloride at a molar ratio of 1:0.9 to 1.25 is mentioned.

As the specific example of the alkylphenol-sulfur chloride condensate (B), there is mentioned TACKIROL V200 available from Taoka Chemical Co., Ltd. in which n is 0 to 10, x and y are 2, R is $C_8H_{17}$ (octyl group) and the content of sulfur is 24% by mass:

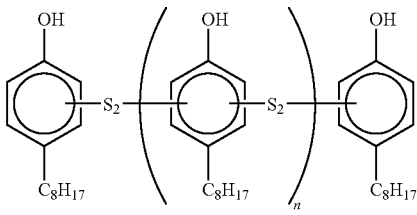

(wherein n is an integer of 0 to 10.)

The compounding amount of the alkylphenol-sulfur chloride condensate (B) is at least 0.5 parts by mass based on 100 parts by mass of the rubber component (A), preferably at least 1.0 part by mass and more preferably at least 8.0 parts by mass. When the compounding amount of the alkylphenol-sulfur chloride condensate (B) is less than 0.5 parts by mass, effect of reducing tan δ is little. The compounding amount of the alkylphenol-sulfur chloride condensate (B) is at most 10 parts by mass based on 100 parts by mass of the rubber component (A) and preferably at most 7 parts by mass. When the compounding amount of the alkylphenol-sulfur chloride condensate (B) exceeds 10 parts by mass, scorch is easily generated during the process of rubber and effect of reducing tan δ is also saturated.

Sulfur (C) used in the present invention is not specifically limited, but insoluble sulfur treated with oil is preferable because the generation of bloom during process can be suppressed and dispersibility is superior and there are specifically mentioned CRYSTEX available from Flexsys K. K. and Sanfel EX available from Sanshin Chemical Industry Co., Ltd.

Herein, insoluble sulfur is sulfur insoluble in carbon disulfide and rubbery hydrocarbon, but the insoluble sulfur mentioned in the present invention is high molecular weight sulfur in which component insoluble in carbon disulfide is at least 80%. It may be high molecular weight sulfur in which component insoluble in carbon disulfide is at least 90%.

The compounding amount of sulfur (C) does not preferably include sulfur (C) with bad dispersibility as possible considering sulfur supply by the alkylphenol-sulfur chloride condensate (B). It does not also preferably include sulfur (C) from the viewpoints of the improvement of strength at break and the improvement of abrasion resistance. The compounding amount is preferably at least 0.1 parts by mass based on 100 parts by mass of the rubber component (A) and more preferably at least 0.2 parts by mass because suitable rubber hardness and steering stability are easily secured and scorch is not too fast (not short). The compounding amount of sulfur (C) is at most 0.45 parts by mass, preferably at most 0.40 parts by mass and more preferably at most 0.35 parts by mass because fracture strength can be suitably secured. When insoluble sulfur is compounded as sulfur, the compounding amount of sulfur represents sulfur excluding oil in the insoluble sulfur.

The compounding amount of silica (D) is at least 10 parts by mass based on 100 parts by mass of the rubber component (A) and preferably at least 20 parts by mass because grip performance and fracture strength are superior. The compounding amount of silica (D) is at most 100 parts by mass based on 100 parts by mass of the rubber component (A) and preferably at most 90 parts by mass because even if the amount is excessively increased, the improvement of grip performance is not expected any more.

Silica (D) is not specifically limited and silica generally used in the rubber industry can be used. Among them, the nitrogen adsorption specific surface area (N2SA) of silica (D) is preferably at least 40 m$^2$/g and more preferably at least 45 m$^2$/g. When the nitrogen adsorption specific surface area (N2SA) of silica (D) is less than 40 m$^2$/g, reinforcing property and abrasion resistance tend to be lowered. The nitrogen adsorption specific surface area (N$_2$SA) of silica (D) is preferably at most 250 m$^2$/g and more preferably at most 240 m$^2$/g. When the nitrogen adsorption specific surface area (N$_2$SA) of silica (D) exceeds 250 m$^2$/g, reinforcing property tends to be not improved above it but processability and rubber viscosity tend to be remarkably deteriorated.

Z115GR (N2SA: 112 m$^2$/g) available from Rhodia is preferably used because reinforcing property and abrasion resistance exhibit adequate effect for being used for a tire for an automobile and processability and dispersibility are also good.

A silane coupling agent is preferably used in combination with silica (D) in the present invention.

The silane coupling agent is not specifically limited, and those have been conventionally compounded in a rubber composition together with silica in the tire industry can be used. Specifically, there are mentioned sulfides series such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane. These silane coupling agents may be used alone or at least two kinds may be used in combination. Among them, bis(3-triethoxysilylpropyl)tetrasulfide and bis(3-triethoxysilylpropyl)disulfide are preferably used.

When the silane coupling agent is compounded, the compounding amount of the silane coupling agent is preferably at least 5 parts by mass based on 100 parts by mass of silica (D), more preferably at least 6 parts by mass and further preferably at least 8 parts by mass because processability and heat build-up property are superior. The compounding amount of the silane coupling agent is preferably at most 12 parts by mass based on 100 parts by mass of silica (D) and more preferably at most 10 parts by mass because when the silane coupling agent is excessively compounded, excessive coupling agent releases sulfur and the rubber is excessively cured; therefore fracture strength is lowered and cost is heightened.

Carbon black (E) is preferably further compounded in the rubber composition for cap tread of the present invention.

The compounding amount of carbon black (E) is preferably at least 2 parts by mass based on the rubber component (A) and more preferably at least 5 parts by mass because the deterioration of rubber by ultraviolet rays is prevented. The compounding amount of carbon black (E) is preferably at most 50 parts by mass based on 100 parts by mass of the rubber component (A) and more preferably at most 45 parts by mass because the processability of carbon black is good.

Carbon black (E) is not specifically limited and carbon black generally used in the tire industry can be used. In particular, the nitrogen adsorption specific surface area (N2SA) of carbon black (E) is preferably at least 40 m$^2$/g and more preferably at least 45 m$^2$/g. When the nitrogen adsorption specific surface area (N$_2$SA) of carbon black (E) is less than 40 m$^2$/g, reinforcing property and abrasion resistance tend to be remarkably deteriorated. The nitrogen adsorption specific surface area of carbon black (E) is preferably at most 300 m$^2$/g and more preferably at most 280 m$^2$/g. When the nitrogen adsorption specific surface area of carbon black (E) exceeds 300 m$^2$/g, dispersibility tends to be bad and reinforcing property and abrasion resistance tend to be lowered all the more.

A rubber composition with high hardness (Hs) can be obtained by further compounding the citraconic imide compound (F) in addition to the alkylphenol-sulfur chloride condensate (B).

As the citraconic imide compound (F), bis citraconic imides are preferable because they are thermally stable and superior in dispersibility in rubber. There are specifically mentioned 1,2-biscitraconic imide methylbenzene, 1,3-biscitraconic imide methylbenzene, 1,4-biscitraconic imide methylbenzene, 1,6-biscitraconic imide methylbenzene, 2,3-citraconic imide methyltoluene, 2,4-biscitraconic imide methyltoluene, 2,5-biscitraconic imide methyltoluene, 2,6-biscitraconic imide methyltoluene, 1,2-biscitraconic imide ethylbenzene, 1,3-biscitraconic imide ethylbenzene, 1,4-biscitraconic imide ethylbenzene, 1,6-biscitraconic imide ethylbenzene, 2,3-biscitraconic imide ethyltoluene, 2,4-biscitraconic imide ethyltoluene, 2,5-biscitraconic imide ethyltoluene and 2,6-biscitraconic imide ethyltoluene. Among them, 1,3-biscitraconic imide methylbenzene is preferable because it is thermally stable in particular, superior in dispersibility in rubber in particular and can obtain a rubber composition with high hardness (Hs) (reversion control) and bond between polymers formed is thermally stable.

1,3-Biscitraconic imide methylbenzene is a compound represented by the under-mentioned chemical formula.

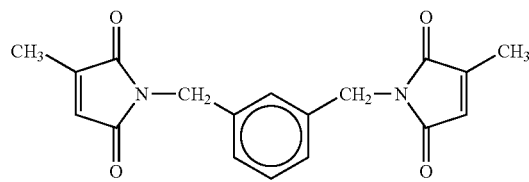

The compounding amount of the citraconic imide compound (F) is preferably at least 0.1 parts by mass based on 100 parts by mass of the rubber component (A) and more preferably at least 0.2 parts by mass. When the compounding amount of the citraconic imide compound (F) is less than 0.1 parts by mass, it is insufficient for the appropriate amount of sulfur and polysulfide bond tends to be mainly formed and complex elastic modulus (E*), tan δ, abrasion resistance and steering stability tend to be inferior. The compounding amount of the citraconic imide compound (F) is preferably at most 5 parts by mass based on 100 parts by mass of the rubber component (A) and more preferably at most 4 parts by mass. When the compounding amount of the citraconic imide compound (F) exceeds 5 parts by mass, it is much more than the appropriate amount of sulfur and the bond number of disulfide formed tends to have peaked.

When the content of filler in a rubber composition is generally reduced, tan δ is lessened but rolling resistance becomes good, but complex elastic modulus (E*) is decreased and steering stability is lowered. At least one compound selected from a group consisting of modified resorcinol resin, modified cresol resin and modified phenol resin is preferably further compounded in order to prepare the rubber composition for cap tread in which tan δ is little, rolling resistance is good, complex elastic modulus (E*) is not reduced and steering stability is good, in the rubber composition of the present invention.

Phenol resin is not specifically limited and is obtained by reacting phenol with aldehydes such as formaldehyde, acetaldehyde and furfral by acid or alkali catalyst. Modified phenol resin includes, for example, phenol resin modified with at least one selected from a group consisting of cashew oil, toll oil, linseed oil, various animal and plant oils, unsaturated aliphatic acid, rosin, alkylbenzene resin, aniline and melamine.

In particular, phenol resin modified with cashew oil is preferable as the modified phenol resin because complex elastic modulus (E*) is improved.

Resorcinol condensate means a compound represented by the chemical formula 1:

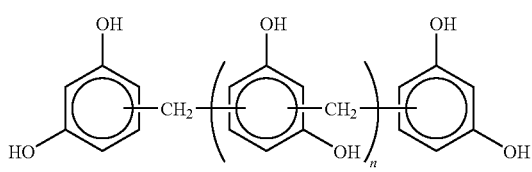

(1)

and modified resorcinol condensate includes those obtained by alkylating the resorcinol condensate represented by the chemical formula 2. Wherein n is an integer. Example of the modified resorcinol condensate includes SUMIKANOL 620 available from Sumitomo Chemical Co., Ltd., Penacolite Resin (1319S available from INDSPEC Chemical Corporation) as resorcinol formalin reaction product and RSM (a mixture of about 60% by mass of resorcinol and about 40% by mass of stearic acid). Among them, SUMIKANOL 620 is preferable because it is superior in stability by variation with time.

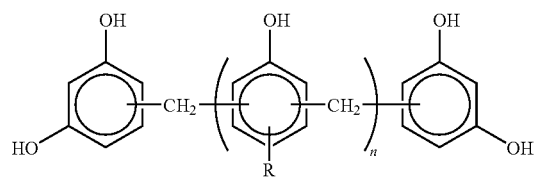

(2)

Cresol resin means a compound represented by the following chemical formula 3. Wherein n is an integer of at least 1.

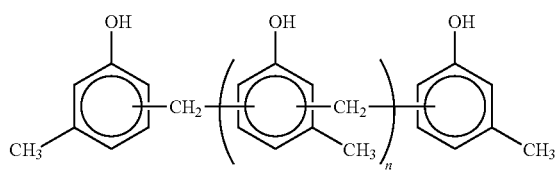

(3)

Since the cresol resin has chemical softening point of about 100° C. (92 to 107° C.), it is solid at normal temperature, but since it is liquid at kneading rubber, metacresol resin is most preferable because it is easily dispersed.

The modified cresol resin includes those obtained by modifying a methyl group at the terminal of the cresol resin to a hydroxyl group and those obtained by alkylating the portion of the repeating unit of the cresol resin.

The content of the at least one compound selected from a group consisting of modified resorcinol resin, modified cresol resin and modified phenol resin is preferably at least 0.5 parts by mass based on 100 parts by mass of the rubber component, more preferably at least 1.0 part by mass and further preferably at least 1.5 parts by mass. When the content of the at least one compound selected from a group consisting of modified resorcinol resin, modified cresol resin and modified phenol resin is less than 0.5 parts by mass, the crosslinking density of the resin is not adequate in comparison with the crosslinking density of sulfur and hardness is lowered. The content of the at least one compound selected from a group consisting of modified resorcinol resin, modified cresol resin and modified phenol resin is preferably at most 3 parts by mass, more preferably at most 2.5 parts by mass and further preferably at most 2.0 parts by mass. When the content of the at least one compound selected from a group consisting of modified resorcinol resin, modified cresol resin and modified phenol resin exceeds 3 parts by mass, the crosslinking density of the resin is too large in comparison with the crosslinking density of sulfur and low heat build-up property is lowered.

When the at least one compound selected from a group consisting of modified resorcinol resin, modified cresol resin and modified phenol resin is included, the crosslinking growth of resorcinol resin, cresol resin and phenol resin is accelerated by further including at least one compound selected from a group consisting of hexamethylenetetramine (HMT), hexamethoxymethylolmelamine (HMMM) and hexamethylolmelaminepentamethylether (HMMPME); as a result, strength at fracture and the hardness of the rubber composition can be preferably improved. Among them, HMT is preferable because methylene (formaldehyde) is generated (it is not generated during process) during the vulcanization of a tire.

The content of the at least one compound selected from a group consisting of HMT, HMMM and HMMPME is preferably at least 0.1 parts by mass based on 100 parts by mass of the rubber component, more preferably at least 0.2 parts by mass and further preferably at least 0.3 parts by mass. When the content of the compound is less than 0.1 parts by mass, the generation of methylene tends to be insufficient and the crosslinking density of the modified resorcinol resin, modified cresol resin and modified phenol resin tends to be not adequate. The content of the at least one compound selected from a group consisting of HMT, HMMM and HMMPME is preferably at most 5 parts by mass, more preferably at most 4 parts by mass and further preferably at most 3 parts by mass. When the content of the compound exceeds 5 parts by mass, strength at fracture tends to be lowered by deterioration caused by thermal oxidation.

The metal salt of methacrylic acid (G) is preferably included from the viewpoint of being superior in that either of abrasion resin, complex elastic modulus E* and elongation at break can be bettered in the cap tread, scorch is not shortened and the reaction of the resorcinol resin, cresol resin and phenol resin is not inhibited.

The metal salt of methacrylic acid (G) is represented by the formula (2).

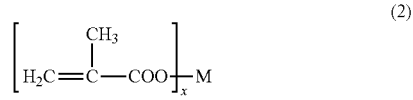
(2)

Wherein M is divalent metal and includes specifically zinc, magnesium, calcium, barium, strontium and nickel. Among them, zinc is preferable because a high purity product can be produced inexpensively.

The specific structural formula of methacrylic acid (G) includes the formula (2a):

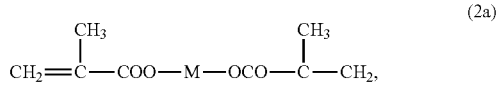
(2a)

and the formula (2b):

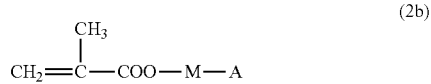
(2b)

(wherein M is same as the formula (2) and A is a hydroxyl group or a hydrogen atom). It may include respectively the formula (2a) and the formula (2b) alone and may include a mixture of the formula (2a) and the formula (2b).

When A is a hydroxyl group, the metal salt of methacrylic acid (G) may be hydrate.

The content of the metal salt of methacrylic acid (G) is preferably at least 0.1 parts by mass based on 100 parts by mass of the rubber component, more preferably at least 0.2 parts by mass and further preferably at least 0.3 parts by mass because the improvement of E* and the improvement of strength at fracture are superior. The content of the metal salt of methacrylic acid (G) is preferably at most 10 parts by mass based on 100 parts by mass of the rubber component, more preferably at most 8 parts by mass and further preferably at most 6 parts by mass because the strength at fracture is superior upon deterioration caused by thermal oxidation.

The content of zinc oxide generally included as a rubber composition for a tire can be reduced by including the metal salt of methacrylic acid (G).

To the rubber composition of the present invention, can suitably be compounded compounding agents generally used in the rubber industry such as, for example, oil, stearic acid, an antioxidant, wax, zinc oxide, a vulcanizing agent other than sulfur and various vulcanization accelerators, in addition to the rubber component (A), alkylphenol-sulfur chloride condensate (B), sulfur (C), silica (D), silane coupling agent, carbon black (E), citraconic imide compound (F), modified resorcinol resin, modified cresol resin and modified phenol resin, HMT, HMMM and HMMPME.

The compounding amount of these other compounding agents may be within a range not damaging the effect of the present invention by the rubber component (A), alkylphenol-sulfur chloride condensate (B), sulfur (C) and silica (D).

The vulcanization accelerator includes sulfenamide, thiazole, thiuram and guanidine vulcanization accelerators.

These vulcanization accelerators may be used alone and at least two kinds may be used in combination.

The rubber composition of the present invention is produced by a general method. Namely, the rubber composition of the present invention can be prepared by kneading the rubber component (A), silica (D) and optionally other compounding agents with a Banbury mixer, a kneader and an open roll, then compounding the alkylphenol-sulfur chloride condensate (B), sulfur (C) and vulcanization accelerators to carry out final kneading, and carrying out vulcanization.

The rubber composition of the present invention is used as the cap of a tire because both of grip performance and abrasion resistance as well as low heat build-up property (low tan δ) are satisfied.

It is preferable that the tread be prepared as double layered structure using the rubber composition for cap tread and the rubber composition for base tread because rolling resistance can be reduced without lowering steering stability.

The tire of the present invention is produced by a usual method using the rubber composition of the present invention. Namely, the rubber composition of the present invention compounding the compounding agents if necessary is extruded and processed in matching with the form of the cap tread of a tire at unvulcanization stage and molded on a tire molding machine by a usual method; thereby unvulcanized tire is formed. The unvulcanized tire is heated and pressurized in a vulcanizer to be able to obtain a tire.

EXAMPLES

The present invention is specifically described based on Examples, but the present invention is not limited only thereto.

Various chemicals used in Examples and Comparative Examples are then described.
Natural rubber (NR): TSR20
High cis BR: BR150B (weight average molecular weight: 5.0×10⁵, molecular weight distribution: 3.3, high cis type (the quantity of 1,4-cis butadiene unit: 97% by weight) manufactured by Ube Industries Ltd.
Modified BR: 1250H (tin-modified BR. lithium initiator: lithium. content of tin atom: 250 ppm. Mw/Mn: 1.5. vinyl bond quantity: 10 to 13% by mass.) available by ZEON Corporation.
SPB-containing BR: VCR617 (crystal 1,2-syndiotactic polybutadiene, the amount of crystal 1,2-syndiotactic polybutadiene: 17% by weight, the melting point of crystal 1,2-syndiotactic polybutadiene: 200° C., the amount of a portion insoluble in boiling n-hexane: 15 to 18% by weight) available by Ube Industries Ltd.
Modified styrene butadiene rubber (modified SBR): HPR 340 (modified S-SBR: bonded styrene amount: 10% by mass. Coupling was carried out with alkoxyl silane and introduced at terminal) available from JSR Corporation.
Silica: Z115Gr ($N_2SA$: 112 $m^2/g$) available from RHODIA
Silane coupling agent: Si75 (bis(3-triethoxysilylpropyl)disulfide) available from Degussa GmbH
Aromatic oil: PROCESS X-140 available from Japan Energy Corporation
Carbon black N330: SHOWBLACK N330 ($N_2SA$: 79 $m^2/g$) available from CABOT JAPAN K. K.
Antioxidant 6C: NOCRAC 6C (N-(1,3-dimethylbutyl)-N'-phenyl-p-phenylenediamine) available from OUCHI SHINKO CHEMICAL INDUSTRIAL CO., LTD.
Wax: SUNNOC WAX available from OUCHI SHINKO CHEMICAL INDUSTRIAL CO., LTD.
Stearic acid: TSUBAKI available from NOF Corporation.
Zinc oxide: GINREI R available from Toho Zinc Co., Ltd.
Sulfur powder (including 5% of oil): Sulfur Powder treated with 5% of oil available from TSURUMI CHEMICAL INDUSTRY CO., LTD.
Vulcanization accelerator DPG: NOCCELER D (1,3-diphenylguanidine) available from OUCHI SHINKO CHEMICAL INDUSTRIAL CO., LTD.
Vulcanization accelerator TBBS: NOCCELER NS (N-tert-butyl-2-benzothiazolyl sulfenamide) available from OUCHI SHINKO CHEMICAL INDUSTRIAL CO., LTD.
Vulcanization accelerator HMT: Hexamethylenebisthiosulfate disodium salt dehydrate: DURALINK HTS available from Flexsys K. K.
Vulcanization accelerator TBZTD: Perkacit TBzTD (tetrabenzylthiuram disulfide available from Flexsys K. K.)
Zinc methacrylate: SR709 available from SARTMER Co., Ltd.
V200: TACKIROL V200 (alkylphenol-sulfur chloride condensate, x and y: 2, R: $C_8H_{17}$ alkyl group, content of sulfur: 24% by mass) available from Taoka Chemical Co., Ltd.

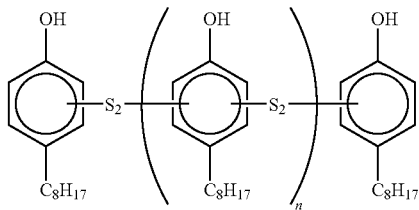

(Wherein n is an integer of 0 to 10.)
PK900: PK900 (1,3-bis(citraconic imidomethyl)benzene) available from Fiexsys Chemicals Sdn. Bhd.

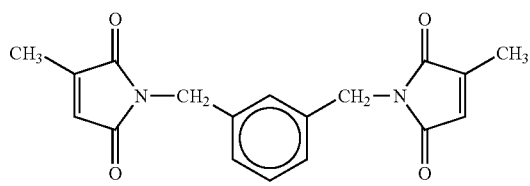

Modified resorcinol: SUMIKANOL 620 (resorcinol-alkylphenol condensate) available from Sumitomo Chemical Co., Ltd.

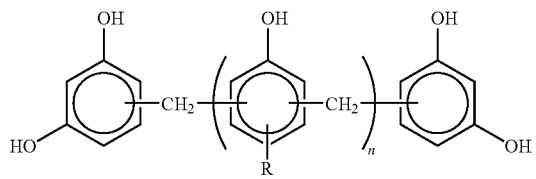

(wherein R is an octyl group.)
Modified cresol: SUMIKANOL 610 (n=16 to 17 in the chemical formula 15) available from Sumitomo Chemical Co., Ltd.

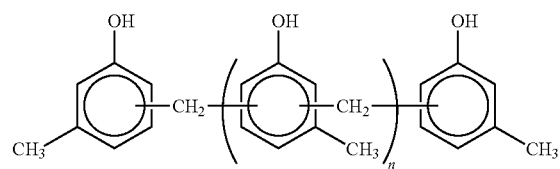

(1)

Examples 1 to 8 and Comparative Examples 1 to 5

Various chemicals excluding the alkylphenol-sulfur chloride condensate, sulfur and a vulcanization accelerator were kneaded with a Banbury mixer according to the compounding amounts shown in Table 1. The compounding amounts shown in Table 1 of the alkylphenol-sulfur chloride condensate, sulfur and a vulcanization accelerator were added to the kneaded product obtained, and the mixture was kneaded with an open roll to obtain unvulcanized rubber compositions. The unvulcanized rubber compositions obtained were vulcanized at 170° C. for 12 minutes to prepare the rubber sheets for test of Examples 1 to 8 and Comparative Examples 1 to 5 and tests shown below were carried out using the rubber sheets for test.

(Viscoelastic Property)
The complex elastic modulus E* and loss tangent tan δ of the vulcanized rubber compositions at 30° C. were measured under the conditions of initial stain of 10%, dynamic strain of 2% and frequency of 10 Hz, using a viscoelasticity spectrometer manufactured by Iwamoto Seisakusyo K.K. It is indicated that the larger the E* is, the higher the rigidity and the higher the hardness is, and the smaller the tan δ is, the more superior the low heat build-up property is.

(Tensile Test)
Tensile test was carried out according to JIS K 6251 "Vulcanized rubber and Thermoplastic rubber—Determination method of Tensile property", using No. 3 dumbbell type test pieces comprising the vulcanized rubber compositions, and elongation at break EB (%) was measured. It is indicated that the larger the EB is, the more superior the rubber strength is.

The unvulcanized rubber compositions were extruded and molded with an extruder equipped with a predetermined shape cap to obtain cap tread shape rubber compositions. Measurements below were carried out for respective test samples. The rubber compositions obtained were laminated on a tire molding machine by a fixed process to prepare tire low covers, these were vulcanized in a mold to prepare pneumatic tires in trial and measurements below were carried out.

The results are shown in Table 1.

(Abrasion Resistance)

Abrasion test was carried out at the conditions of room temperature and a slip rate of 20% with a Lambourn abrasion tester. The reciprocal number of abrasion quantity was displayed by index referring Comparative Example 1 as 100 (basis). It is indicated that the larger the value is, the more the abrasion resistance is improved.

(Rolling Resistance)

The tan δ was measured at the conditions of dynamic strain amplitude of 2%, frequency of 10 Hz and temperature of 60° C. with a spectrometer manufactured by Ueshima Seisakusyo Co., Ltd. The reciprocal numbers of the tan δ were displayed by indices referring Comparative Example 1 as 100 (basis). It is indicated that the larger the value is, the more the rolling resistance is reduced.

(Vehicle Handling Test)

Functional test was carried out on a test course by a general passenger automobile loading the tires, using tires obtained by the rubber compositions obtained in respective Examples and Comparative Examples. The higher the score is (maximum possible score is 6), the better the steering stability is.

The evaluation results of the above-mentioned tests are shown in Table 1.

TABLE 1

|  | Examples |  |  |  |  |  |  |  |  |
|---|---|---|---|---|---|---|---|---|---|
|  | 1 | 2 | 3 | 4 | 5 | 6 | 7 | 8 | 9 |
| Compounding amount (parts by mass) | | | | | | | | | |
| Modified SBR | 70 | 70 | 70 | 70 | 70 | 70 | 70 | 70 | 70 |
| NR | 30 | 30 | 30 | 30 | 30 | 30 | 30 | 30 | 30 |
| High cis BR | — | — | — | — | — | — | — | — | — |
| Modified BR | — | — | — | — | — | — | — | — | — |
| SPB-containing BR | — | — | — | — | — | — | — | — | — |
| Silica | 45 | 45 | 45 | 45 | 45 | 35 | 35 | 35 | 35 |
| Carbon black N330 | 5 | 5 | 5 | 5 | 5 | 5 | 5 | 5 | — |
| Silane coupling agent | 3.6 | 3.6 | 3.6 | 3.6 | 3.6 | 2.8 | 2.8 | 2.8 | 2.8 |
| Modified resorcinol | — | — | 1.5 | — | — | — | — | — | — |
| Modified cresol | — | — | — | 1.5 | — | 1.5 | 1.5 | 1.5 | 1.5 |
| PK900 | — | — | — | — | — | — | — | — | 2 |
| Zinc oxide | 2.5 | 2.5 | 2.5 | 2.5 | 2.5 | 2.5 | 2.5 | 1.0 | 2.5 |
| Stearic acid | 2 | 2 | 2 | 2 | 2 | 2 | 2 | 2 | 2 |
| Antioxidant 6C | 2 | 2 | 2 | 2 | 2 | 2 | 2 | 2 | 2 |
| Wax | 1.5 | 1.5 | 1.5 | 1.5 | 1.5 | 1.5 | 1.5 | 1.5 | 1.5 |
| Aroma oil | 3 | 3 | 3 | 3 | 3 | 3 | 3 | 3 | 3 |
| Powder sulfur (including 5% of oil) | — | 0.3 | — | — | — | — | 0.3 | 0.3 | 0.3 |
| Vulcanization accelerator TBBS | 1.8 | 1.8 | 1.8 | 1.8 | 1.8 | 1.8 | 1.8 | 1.8 | 1.8 |
| Vulcanization accelerator HMT | — | — | 0.45 | 0.45 | — | 0.45 | 0.45 | 0.45 | 0.4 |
| Zinc methacrylate | — | — | — | — | 2 | 2 | 2 | 2 | 2 |
| V200 | 10 | 8 | 10 | 10 | 10 | 10 | 6 | 6 | 6 |
| Evaluation result | | | | | | | | | |
| E* (30° C.) | 4.22 | 4.25 | 4.40 | 4.48 | 4.40 | 4.50 | 4.46 | 4.40 | 4.70 |
| tan δ (30° C.) | 0.101 | 0.087 | 0.095 | 0.091 | 0.083 | 0.078 | 0.075 | 0.077 | 0.072 |
| EB Elongation at break (%) | 435 | 395 | 440 | 450 | 370 | 470 | 450 | 410 | 470 |
| Abrasion resistance | 140 | 135 | 145 | 150 | 130 | 165 | 165 | 175 | 165 |
| Rolling resistance | 100 | 105 | 104 | 104 | 106 | 110 | 111 | 110 | 112 |
| Vehicle handling test | 5 | 5 | 5 | 6 | 5 | 6 | 6 | 6 | 6 |

|  | Examples | | | Comparative Examples | | | | |
|---|---|---|---|---|---|---|---|---|
|  | 10 | 11 | 12 | 1 | 2 | 3 | 4 | 5 |
| Compounding amount (parts by mass) | | | | | | | | |
| Modified SBR | 70 | 70 | 70 | 70 | 70 | 70 | 70 | 70 |
| NR | — | — | — | 30 | 30 | 30 | 30 | 30 |
| High cis BR | 30 | — | — | | | | | |
| Modified BR | — | 30 | — | | | | | |
| SPB-containing BR | — | — | 30 | | | | | |
| Silica | 45 | 45 | 45 | 45 | 45 | 45 | 45 | 45 |
| Carbon black N330 | 5 | 5 | 5 | 5 | 5 | 5 | 5 | 5 |
| Silane coupling agent | 3.6 | 3.6 | 3.6 | 3.6 | 3.6 | 3.6 | 3.6 | 3.6 |
| Modified resorcinol | — | — | — | — | — | — | — | — |
| Modified cresol | — | — | — | — | — | 1.5 | 1.5 | — |
| PK900 | — | — | — | — | — | — | 2 | — |
| Zinc oxide | 2.5 | 2.5 | 2.5 | 2.5 | 2.5 | 2.5 | 2.5 | 2.5 |
| Stearic acid | 2 | 2 | 2 | 2 | 2 | 2 | 2 | 2 |
| Antioxidant 6C | 2 | 2 | 2 | 2 | 2 | 2 | 2 | 2 |
| Wax | 1.5 | 1.5 | 1.5 | 1.5 | 1.5 | 1.5 | 1.5 | 1.5 |

TABLE 1-continued

|  | | | | | | | | |
|---|---|---|---|---|---|---|---|---|
| Aroma oil | 3 | 3 | 3 | 3 | 3 | 3 | 3 | 3 |
| Powder sulfur (including 5% of oil) | — | — | — | 1.25 | 2.5 | 1.25 | 1.25 | — |
| Vulcanization accelerator TBBS | 1.8 | 1.8 | 1.8 | 1.8 | 1.8 | 1.8 | 1.8 | 1.8 |
| Vulcanization accelerator HMT | — | — | — | — | — | 0.45 | 0.45 | — |
| Zinc methacrylate | — | — | — | — | — | — | — | — |
| V200 | 10 | 10 | 10 | 6 | 3 | 6 | 6 | 16 |
| Evaluation result | | | | | | | | |
| E* (30° C.) | 4.15 | 4.01 | 4.48 | 4.14 | 4.05 | 4.36 | 4.62 | 4.79 |
| tan δ (30° C.) | 0.098 | 0.071 | 0.115 | 0.112 | 0.087 | 0.075 | 0.071 | 0.088 |
| EB Elongation at break (%) | 405 | 360 | 410 | 400 | 315 | 420 | 410 | 260 |
| Abrasion resistance | 165 | 140 | 125 | 100 | 65 | 105 | 105 | 115 |
| Rolling resistance | 101 | 112 | 97 | 100 | 106 | 107 | 107 | 105 |
| Vehicle handling test | 5 | 5 | 6 | 5 | 5 | 5 | 6 | 6 |

According to the present invention, a rubber composition for cap tread satisfying both of the low heat build-up property and fracture strength and a tire having cap tread using the same can be provided by including the specific amounts of specific rubber components (A), specific alkylphenol-sulfur chloride condensate (B), sulfur (C) and silica (D) and in particular, lessening the content of sulfur (C).

What is claimed is:

1. A rubber composition for cap tread comprising 0.5 to 10 parts by mass of an alkylphenol-sulfur chloride condensate (B) indicated by the formula (B1):

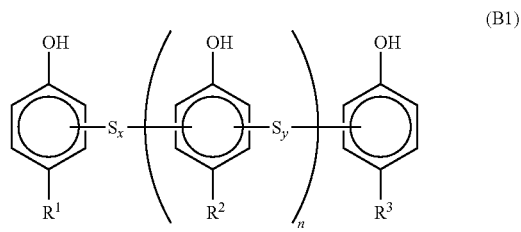

(B1)

wherein $R^1$ to $R^3$ are same or different, and either is an alkyl group having 5 to 12 carbons; x and y are same or different, and either is an integer of 2 to 4; and n is an integer of 0 to 10,
0 to 0.45 parts by mass of sulfur (C),
10 to 100 parts by mass of silica (D), and
5 to 12 parts by mass of at least one silane coupling agent selected from the group consisting of bis(3-triethoxysilylpropyl)disulfide and mercapt series silane coupling agents based on 100 parts by mass of silica (D),
based on 100 parts by mass of a rubber component (A) comprising 30 to 80% by mass of a modified styrene-butadiene rubber having a primary amino group and/or an alkoxysilyl group and 20 to 70% by mass of at least one diene rubber selected from a group consisting of a natural rubber, an isoprene rubber, a butadiene rubber, a tin-modified butadiene rubber and a polybutadiene rubber comprising 1,2-syndiotactic crystals.

2. The rubber composition for cap tread of claim 1, further comprising 2 to 50 parts by mass of carbon black (E) based on 100 parts by mass of the rubber component (A).

3. The rubber composition for cap tread of claim 1, further comprising 0.1 to 5 parts by mass of a citraconic imide compound (F) based on 100 parts by mass of the rubber component (A).

4. The rubber composition for cap tread of claim 1, further comprising 0.1 to 10 parts by mass of a metal salt of methacrylic acid (G) represented by the formula (1):

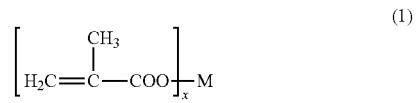

(1)

wherein M is metal and x is an integer of 1 or 2, based on 100 parts by mass of the rubber component (A).

5. A tire having cap tread comprising the rubber composition for cap tread of claim 1.

6. The rubber composition for cap tread of claim 1, wherein $R^1$ to $R^3$ are a $C_8H_{17}$ alkyl group.

7. A tire having cap tread comprising the rubber composition for cap tread of claim 2.

8. A tire having cap tread comprising the rubber composition for cap tread of claim 3.

9. A tire having cap tread comprising the rubber composition for cap tread of claim 4.

10. A tire having cap tread comprising the rubber composition for cap tread of claim 6.

* * * * *